United States Patent [19]

Roscoe

[11] Patent Number: 5,440,118
[45] Date of Patent: Aug. 8, 1995

[54] METHODS AND APPARATUS FOR DETERMINING FORMATION LITHOLOGY BY GAMMA RAY SPECTROSCOPY

[75] Inventor: Bradley A. Roscoe, Ridgefield, Conn.

[73] Assignee: Schlumberger Technology Corporation, Ridgefield, Conn.

[21] Appl. No.: 221,158

[22] Filed: Mar. 31, 1994

[51] Int. Cl.⁶ .............................................. G01V 5/10
[52] U.S. Cl. ................. 250/269.6; 250/262; 250/269.8
[58] Field of Search .................... 250/269.6, 269.8, 262

[56] References Cited

U.S. PATENT DOCUMENTS

| | | | |
|---|---|---|---|
| 3,662,173 | 5/1972 | Youmans | 250/269.8 |
| 3,930,154 | 12/1975 | Scott | 250/262 |
| 4,208,580 | 6/1980 | Schweitzer et al. | 250/269.6 |
| 4,317,993 | 3/1982 | Hertzog, Jr. et al. | 250/269.8 |
| 4,390,783 | 6/1983 | Grau . | |
| 4,712,424 | 12/1987 | Herron | 250/256 |
| 4,722,220 | 2/1988 | Herron | 250/256 |
| 4,773,264 | 9/1988 | Herron | 364/422 |
| 4,810,876 | 3/1989 | Wraight et al. | 250/262 |
| 4,903,527 | 2/1990 | Herron | 364/482 |
| 5,086,224 | 2/1992 | Roscoe et al. . | |

OTHER PUBLICATIONS

Field Experience in Measuring Oil Content, Lithology and Porosity With a High-Energy, Neutron-Induced Spectral Logging System; W. A. Hoyer and R. C. Rumble, Humble Oil & Refining Co., Houston, Tex., Journal of Petroleum Technology, Jul. 1965, pp. 801–807.

Using Nuclear Methods in Oil-Well Logging by Richard L. Caldwell, Magnolia Petroleum Co., Dallas, Tex., Dec. 1958–Nucleonics, pp. 58–65.

The Gamma Spectrometer Tool Inelastic and Capture Gamma-Ray Spectroscopy for Reservoir Analysis by Peter Westaway, Schlumberger Technical Services, Paris, France and Russei Hertzog, Ronald E. Plasek, Schlumberger Well Services, Houston, Tex., Sep., 1980, pp. 1–16 (SPE 9461).

Primary Examiner—Carolyn E. Fields
Attorney, Agent, or Firm—Richard G. Berkley; Leonard W. Pojunas

[57] ABSTRACT

Inelastic scattering gamma ray spectra taken in a borehole are analyzed by a least squares spectral fitting process to determine the relative elemental contributions thereto of chemical elements postulated to be present in unknown earth formations and contributing to the measured spectra from the formations. The relative inelastic yields for silicon, calcium and magnesium are calibrated to provide straightforward estimates of the respective elemental concentrations for those elements and of the volumetric fractions of the elements or associated rock types, such as sandstone, limestone and dolomite, in the formations. The ratio of the relative inelastic yields for magnesium and calcium provides an indication of the degree of dolomitization of a formation. A technique for determining formation iron content from the relative inelastic iron yield in open or cased holes is also disclosed. Based on the calibrated inelastic yields for silicon and/or calcium, calibrated estimates of the elemental yields from measured thermal neutron capture gamma ray spectra may also be determined, from which further information concerning formation lithology may be derived. In addition, the calibrated inelastic yields and the calibrated capture yields may be combined to provide an alternative technique for deriving volumetric fractions.

51 Claims, 6 Drawing Sheets

METHODS AND APPARATUS FOR DETERMINING FORMATION LITHOLOGY BY GAMMA RAY SPECTROSCOPY

BACKGROUND OF THE INVENTION

In the borehole environment, lithology identification is usually made by cross plotting the responses of the standard gamma ray bulk density tool and the standard neutron porosity tool, possibly aided by information of the photoelectric factor ($P_e$) of the formation and gamma ray information from the standard gamma ray log. Although these techniques work reasonably well for resolving lithology issues in simple formations or binary mixtures, they are not always adequate in more complex lithologies involving mixtures of different minerals, such as limestone formations with variable inclusion of dolomite and anhydride, sandstones with calcite cementing, or calcium-silicate formations. Moreover, the standard bulk density log utilizes a cesium 137 gamma ray source. As this isotope is highly radioactive and relatively long-lived (30 year half-life), it represents a potential hazard both to operating personnel and to the environment in the event of loss during use.

Efforts have been made heretofore to overcome the limitations of the aforementioned cross plot techniques, which in the main rely on tool responses primarily sensitive to porosity, by developing lithological information based on the elemental analysis of formations using neutron-induced gamma ray spectroscopy. In general, logging tools measuring neutron-induced spectra employ a 14 MeV D-T neutron accelerator as the neutron source and select the type of gamma ray to be detected, i.e., inelastic scattering, thermal neutron capture or activation, by appropriate timing of the detector gates. The measured spectra are then processed to develop the elemental information. In one form of data processing, a spectral fitting technique compares a measured spectrum to a linear sum of weighted standard spectra. The weight applied to each of the standards is varied until the sum is, in a least-squares sense, the best fit to the observed spectrum. The weights (yields) then represent the relative contributions to the total spectrum of the elements in the standard set.

Use of the aforementioned spectral-fitting method to analyze thermal neutron capture spectra for lithology purposes can provide much useful information at relatively good logging speeds, as described, for example, by Westaway et al. in "The Gamma Spectrometer Tool Inelastic and Capture Gamma-Ray Spectroscopy For Reservoir Analysis" Soc Pet Eng 55th Ann Fall Conf., Sept., 1980, Paper SPE-9461. The determination of absolute elemental yields from the relative elemental yields measured by the logging tool, however, has always been a difficult problem. This is caused by several factors, the most important of which is that the relative yields, from capture, are extremely sensitive to borehole and formation sigmas (macroscopic capture cross section). Because of such sigma sensitivity, the depth of investigation of the capture measurement can vary substantially from borehole to borehole (or even within a single borehole as borehole and/or formation conditions change), e.g., from 6 to 30 inches, making environmental correction of the measurement difficult. Also, as the salinity of the borehole or formation fluids increases, not only does the depth of investigation shrink, but the relative contribution of the lithologically important gamma rays decreases as chlorine-originated capture gamma rays increase. In fact, in a highly saline borehole/formation environment chlorine gamma rays can amount to as much as 90% of the signal. This additional factor can seriously degrade the results of the capture spectral fitting analysis.

The aforementioned Westaway et al. Paper SPE-9461 also describes the analysis by spectral fitting of observed inelastic scattering gamma ray spectra to obtain relative elemental yields for carbon and oxygen, which are used to derive a C/O estimate, and calcium and silicon, which are used to derive a lithology indicator. Westaway et al. do not describe converting either the capture relative elemental yields or the inelastic relative elemental yields to absolute elemental yields.

In U.S. Pat. No. 4,810,876, Wraight et al. disclose an indirect method for converting relative elemental yields, from activation and capture gamma ray spectra, to absolute elemental yields. Although this approach provides improved results relative to earlier conversion methods, it is desirable to provide a more straightforward method of converting relative yields to elemental concentrations (absolute yields) and for deriving the volumetric fractions of the constituents of an unknown formation. It is desirable also to provide a technique which overcomes the aforementioned difficulties associated with deriving elemental concentrations from capture gamma ray spectra and which, at the same time, affords elemental concentrations from inelastic gamma ray spectra.

SUMMARY

The foregoing and other disadvantages and deficiencies of the prior art are overcome, in accordance with the invention, by the provision of methods and apparatus in which inelastic scattering gamma ray energy spectra, and preferably also thermal neutron capture gamma ray energy spectra, taken in earth formations traversed by a borehole are analyzed by spectral fitting to derive the relative elemental contributions to the inelastic spectra, and preferably also the relative elemental contributions to the capture spectra, of the elements postulated to be present in the borehole/formation environment and to have contributed to the measured spectra. In accordance with the invention, it has been determined that reliable estimates of the volumetric content and/or the elemental concentration of silicon and calcium in a formation of unknown composition can be derived based solely on the measured relative inelastic elemental yields for those elements and predetermined calibration relationships relating the relative inelastic gamma ray yields for silicon and calcium to the elemental content of test formations of known composition. Thus the relative inelastic silicon and calcium yields afford valuable lithological information enabling the ready differentiation of sandstones, limestones and mixtures thereof.

Similar information as to the degree of dolomitization of a formation can be determined, in accordance with the invention, from the relative inelastic yield for magnesium. Alternatively, an indication of dolomitization can be ascertained from the ratio of the relative inelastic magnesium yield to the relative inelastic calcium yield.

According to a further feature of the invention, an estimate of the iron content or concentration in an unknown formation can be derived from the relative inelastic iron yield, both in cased and uncased holes. This is accomplished by first calibrating the relative inelastic iron response in test boreholes of known iron content, e.g., the tool housing, casing, etc. This response is then subtracted from the relative inelastic iron yield resulting from spectral fitting of the measured inelastic spectrum taken in a borehole/formation to be investigated.

Pursuant to another feature of the invention, the relative inelastic silicon and/or calcium yields may be used to calibrate the relative elemental yields obtained by spectral fitting of the measured thermal neutron capture gamma ray spectrum. The relative inelastic silicon and/or calcium yields, together with their respective inelastic gamma ray sensitivities, are used to derive a calibration ratio, which is then applied to the relative capture elemental yields to calibrate them in inelastic parameter space. So calibrated, the relative capture yields may be used to derive still other lithological information of interest.

In an alternative technique for determining elemental volumetric fractions in an unknown formation, a normalization factor is derived by summing (i) the products of the relative inelastic elemental yields for elements specifically attributable to the formation and their respective inelastic volume sensitivities and (ii) the products of the calibrated capture elemental yields for elements specifically attributable to the formation and their respective capture volume sensitivities. The volumetric fraction of a particular element (or mineral, oxide, etc.) in the formation is then obtained by dividing the product of the relative inelastic yield for that element and its inelastic gamma ray volume sensitivity (or the product of the calibrated capture yield for that element and its capture gamma ray volume sensitivity) by the normalization factor.

BRIEF DESCRIPTION OF THE DRAWINGS

The objects and advantages of the invention may be further understood from the following detailed description of exemplary embodiments thereof, taken in conjunction with the accompanying drawings, in which.

DETAILED DESCRIPTION

Figure 1:
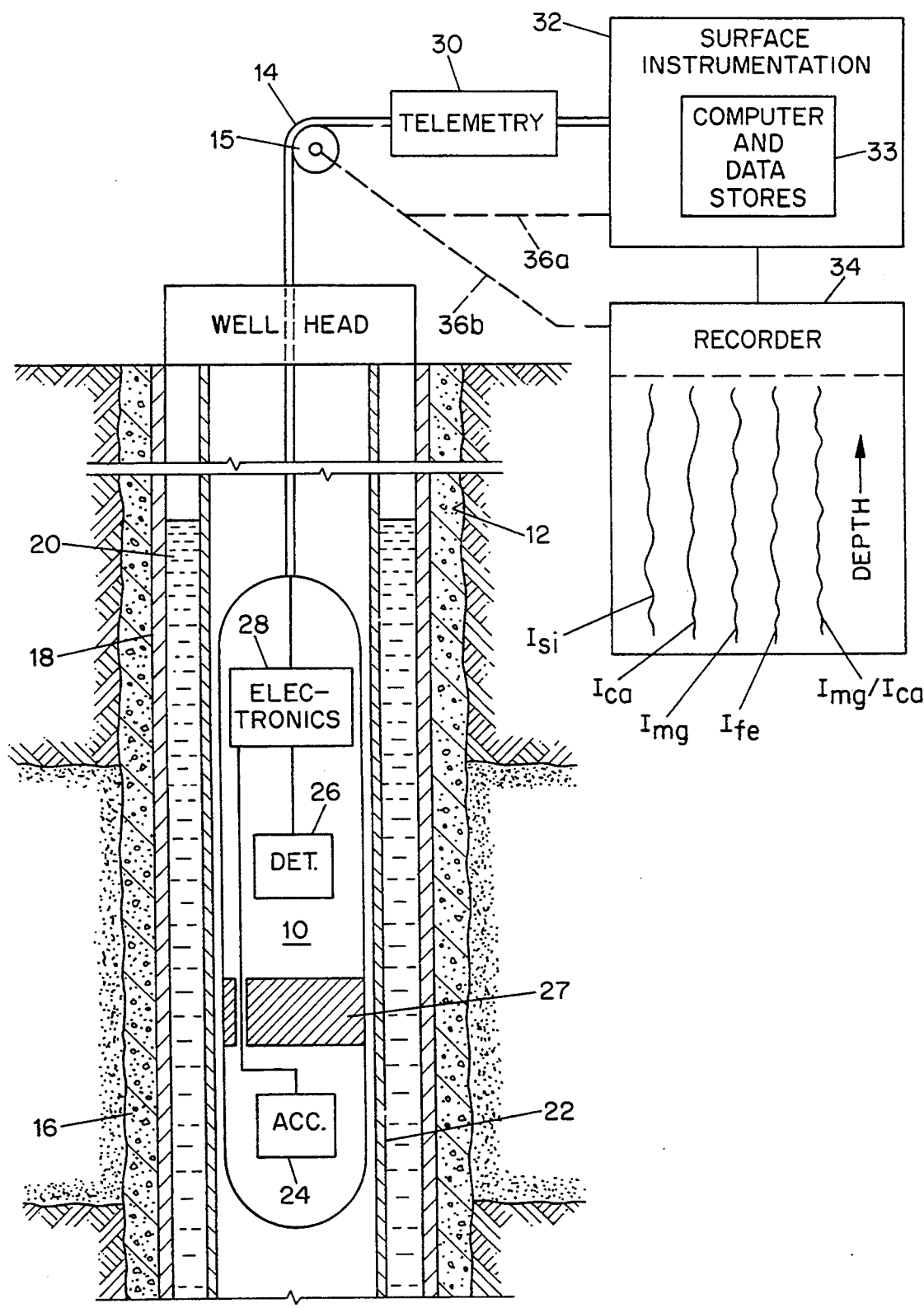
FIG. 1 is a schematic view of a well logging tool constructed in accordance with the invention, showing a downhole through-tubing sonde and the associated surface equipment.

As illustrated in FIG. 1, the well logging tool includes a downhole sonde 10 suspended in a well bore 12 for movement therealong by an armored cable 14 and a sheave wheel 15. The well bore 12 is shown as cased, including the usual annulus of cement 16 and steel casing 18, and as including a borehole fluid 20. In the embodiment of FIG. 1, the sonde 10 is shown as sized for passage through a tubing string 22. It will be understood, however, that the invention has utility as well in cased holes without tubing, in open holes and in logging-while-drilling applications. When so used, the sonde 10 may be sized as desired to suit the requirements of the particular application. Also, if desired the sonde 10 may be provided with an eccentering device (not shown) to position it against the sidewall of the tubing, casing or borehole, as the case may be.

The sonde 10 includes a pulsed neutron accelerator 24 and at least one gamma ray detector 26 located thereabove. Additional gamma ray detectors may be provided and, if so, are preferably spaced apart lengthwise of the sonde 10. High-density shielding 27 is preferably interposed between the accelerator 24 and the detector 26 to reduce the effect of neutron and/or gamma rays streaming along the sonde 10 and the borehole 12. The sonde 10 may be surrounded by a boron carbide impregnated sleeve (not shown) in the region of the accelerator 24 and the detector 26 to minimize the detection of gamma rays originating from neutron interactions in the sonde 10 and the borehole fluid 20.

An electronics section, shown schematically at 28, controls the operation of the accelerator 24, the gating of the detector 26, the acquisition and telemetering of count data to the surface, and the acquisition of control signals from the surface. At the surface, the count data are received by truck or skid-mounted telemetry circuits 30 and computerized surface instrumentation equipment 32. Electrical power for the sonde 10 is supplied through the cable 14 from a power source (not shown) at the surface. Suitable power sources (also not shown) are also included in the sonde 10 for the purpose of driving the neutron accelerator 24, the detector 26 and other downhole electronics.

As described more fully hereinafter, the surface instrumentation 32 includes a suitable programmed digital computer and ancillary data stores indicated collectively at 33, for performing a spectral-fitting analysis of the measured inelastic gamma ray and capture gamma ray energy spectra to determine relative elemental yields for the elements of interest, e.g. hydrogen, silicon, calcium, chlorine, sodium, iron, etc., for capture spectra and carbon, oxygen, silicon, calcium, magnesium, iron, etc., for inelastic spectra, and for deriving therefrom, in accordance with the invention, information useful in identifying the lithology and elemental concentrations of the earth formations under investigation. A suitable computer for this purpose is the PDP-11/34 manufactured by the Digital Equipment Corporation, Maynard, Mass. The outputs generated by the spectral-fitting analysis, e.g. the relative elemental yields ($I_x$ for the inelastic yields and $C_x$ for the capture yields) and their statistical errors and other parameters of the fitting process, are conveyed to a conventional recorder/plotter 34 and are recorded as a function of borehole depth. To that end, the usual cable-following linkage, shown schematically at 36a and 36b, is provided to provide measurements of the depth of the sonde 10 within the borehole 12 to the data processing equipment 33 and the recorder/plotter 34.

Figure 2:
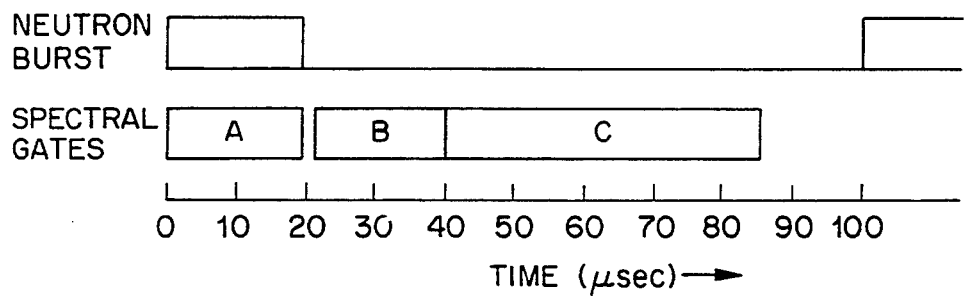
FIG. 2 illustrates timing regimes for the neutron bursts and detector counting gates used in generating gamma ray energy spectra in accordance with the invention.

In acquiring the measured spectra, the accelerator 24 is operated periodically to provide repetitive bursts of fast neutrons as illustrated in FIG. 2. According to a preferred operating cycle, neutron bursts of approximately 15–20 μsec duration are generated at approximately 100 μsec intervals. Gate A, substantially coinciding with the neutron burst, is used to detect inelastic gamma rays produced by the fast neutrons, while other gates B and C may be used to detect capture gamma rays produced as the neutrons slow down to thermal energy and are captured by the nuclei of the borehole and formation constituents.

Inelastic gamma ray energy spectra from Gate A (and capture spectra from gates B and C) are obtained by accumulating the gate counts-per-channel signals for the detector 26 for a period long enough to give a statistically satisfactory spectrum or to correspond to a desirable depth sampling interval, e.g. on the order of 20 seconds for the timing sequence of FIG. 2 for a six-inch depth interval. This is conveniently done at the surface under the control of the surface instrumentation 32 to generate spectra over the energy range of interest. Preferably, the gamma ray energy range detected is from approximately 1.0 MeV to 7.5 MeV, so as to include the inelastic Mg line at 1.37 MeV and the inelastic Fe lines at 1.24 MeV and 1.33 MeV. The surface instrumentation 32 is then recycled to zero, and new channel count data are accumulated for spectra for a new depth level in the well bore 12.

In accordance with the invention, the measured energy spectrum (or spectra if both inelastic and capture gamma rays are detected) at each depth level is analyzed by comparison with a composite spectrum made up of weighted standard spectra of the constituents postulated to comprise the formation and the borehole. As described in the commonly-owned U.S. Pat. No. 3,521,064 to Moran et al., the disclosure of which is hereby incorporated by reference, the different amounts of the standard spectra (the relative elemental yields) which give the best fit of the composite spectrum to the unknown spectrum represent the relative contributions of the constituents in the formation and borehole. By appropriate selection of the standards, the contributions of the elements of interest, such as carbon, oxygen, silicon, calcium, magnesium, iron, etc., can be obtained.

Once the relative yields of inelastic ($I_X$) or capture ($C_X$) gamma rays have been determined, the elemental concentrations of the postulated constituents in the formation may be determined in accordance with the teachings of the commonly-owned U.S. Pat. No. 4,390,783 to Grau, the disclosure of which is hereby incorporated by reference.

The 100 μsec repetition rate illustrated in FIG. 2 is set high to enhance the statistical precision of the inelastic scattering gamma ray spectra. Closely spaced neutron bursts, however, have the disadvantage that background gamma rays, resulting in this instance predominantly from thermal neutron capture reactions between formation and borehole constituents and neutrons from one or more preceding bursts, will be present during the detection periods for the inelastic scattering gamma rays. Such capture gamma rays will of course be sensed by the detector and, unless compensated for, will tend to degrade the detected inelastic gamma ray spectra.

The counts detected by the detector 26 in spectral gate B of FIG. 2 may be used according to the teachings of the commonly-owned U.S. Pat. No. 4,232,220 to Hertzog to correct the inelastic spectra detected in gate A for capture background gamma rays. According to U.S. Pat. No. 4,232,220, background spectra from Gate B may be subtracted from the inelastic spectra detected in gate A resulting in new inelastic spectra corrected for background effects. The pertinent portions of the '220 patent are incorporated herein by reference.

Alternatively, the counts detected by the detector 26 in spectral gate A of FIG. 2 may be corrected for background in accordance with the teachings of the commonly-owned U.S. Pat. No. 4,317,993 to Hertzog et al., wherein a gate similar to that of gate C of FIG. 2 is used to generate gamma ray spectra produced by thermal neutron capture reactions from the preceding neutron burst. A standard background spectrum is derived from the gate C counts for use in the aforementioned spectral fitting of the inelastic gamma ray spectrum. Alternatively, the detected capture gamma ray spectra from gate C may first be pre-analyzed, by comparison with composite spectra of constituents postulated to have contributed to the detected capture spectra, to determine which constituents have contributed significantly to the capture spectrum. The standard spectra for such significant capture gamma ray-contributing constituents may then be used as standard background spectra for analysis of the inelastic gamma ray spectrum. U.S. Pat. No. 4,317,993 is incorporated herein by reference for the disclosure of correcting inelastic spectra with gamma ray spectra derived from gates such as gate C of FIG. 2.

The standard spectra employed in the standard spectra sets, e.g. inelastic, capture and background, are taken in the laboratory with the same tool and in the same manner as used to measure the unknown spectra during logging of unknown formations, but in special laboratory formations designed to emphasize the spectral contribution of each postulated constituent. Hence the standard spectra will include any effects resulting from instrumentation or measurement technique. The measured standards thus derived are stored as tables in the memory of the computerized surface equipment 33 for comparison with the unknown measured spectra.

The spectral fitting technique described in the Moran et al. '064 patent and the other patents referred to above employs a linear least-squares method to search for a best fit between the composite spectrum (constructed from the constituent standard spectra) and the measured (unknown) spectrum. Although, as indicated above, the linear least-squares fitting method may be used in accordance with the present invention to determine the relative elemental yields, it is preferred that the nonlinear least-squares fitting technique described in the commonly-owned copending U.S. application Ser. No. 08/064,622 filed on May 20, 1993 by Roscoe et al. and entitled "Gamma-Ray Spectroscopy Method and Apparatus for Determining Concentration of Elements in an Unknown Material" be used The pertinent portions of application Ser. No. 08/064,622 are hereby incorporated by reference.

In general, the spectral fitting technique of application Ser. No. 08/064,622 endeavors to match the parameters representative of the conditions under which the measured (unknown) spectra and the standard spectra were taken. Such parameters include the gain and offset of the gamma ray spectra detection and acquisition electronics, the background subtraction factor (BSF), the resolution degradation factor (RDF) and possibly other factors. The best fit is determined through minimizing a function of both the measured spectrum and the composite spectrum made up of a combination of the standard spectra, while modifying simultaneously some or all of the elemental yields and the aforementioned parameters. It may be based on any nonlinear least squares search, e.g., a gradient search or the Marquardt method, for a global minimum of $X^2 = (S\ Y - U)^T W\ (S\ Y - U)$, where "U" is a matrix representing the measured spectrum, "S" is a matrix representing the composite spectrum, "Y", is a matrix representative of the elemental yields and "W" is a weight matrix. The outputs of the nonlinear fitting process are the net constituent spectra and their variance spectra, the relative elemental yields and their statistical errors for both measured and background spectra, gain, offset and RDF with statistical errors, BSF and its associated errors, and $X^2$ (the weighted sum of the squares of the deviation of the fitting function (composite spectrum) and the measured function (measured spectrum).

Figure 3:
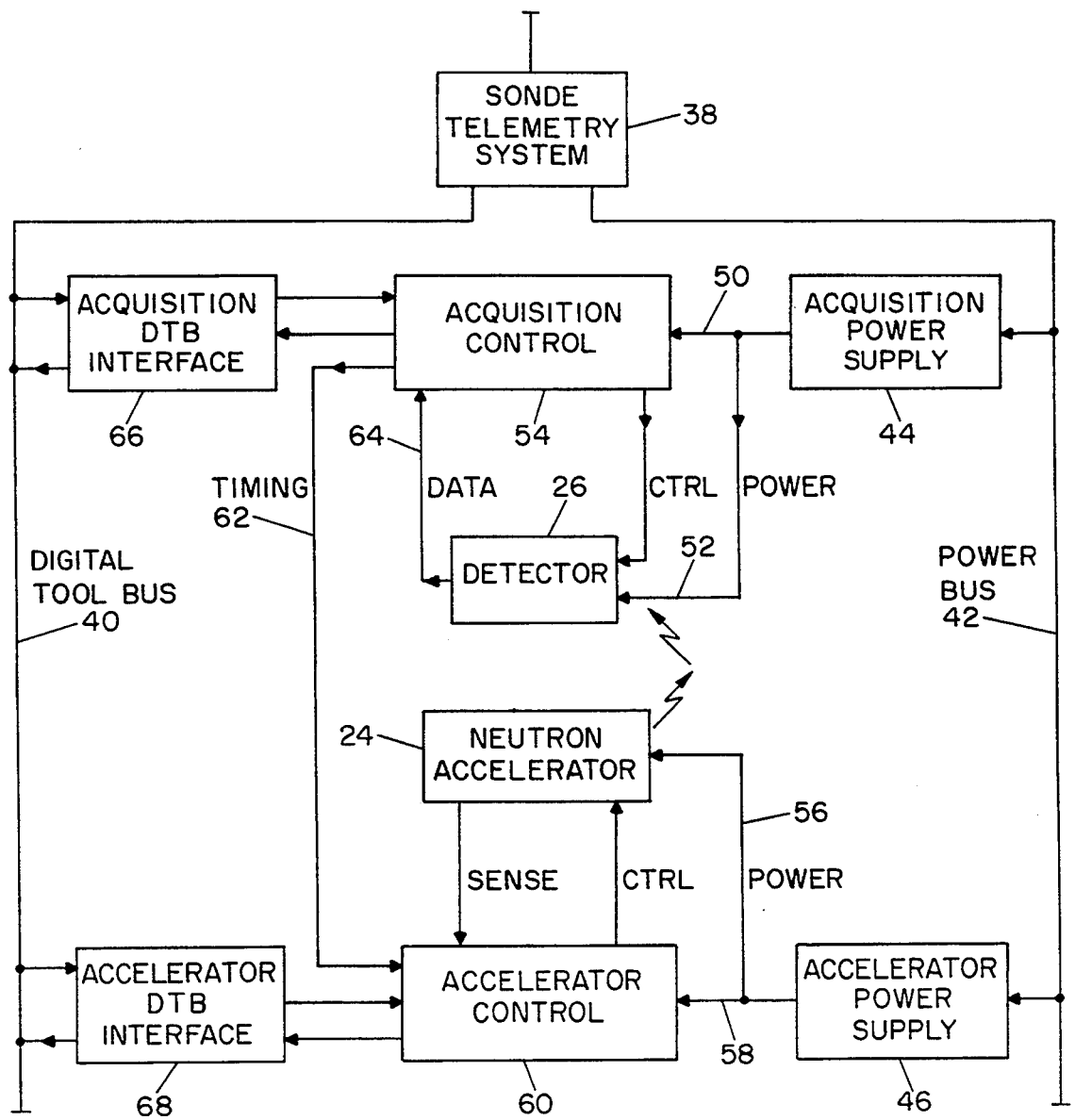
FIG. 3 is a schematic block diagram of the downhole electronics of the sonde of FIG. 1.

FIG. 3 illustrates a block diagram of the downhole circuits used to power and control the neutron accelerator 24, to power and control acquisition of gamma ray count data from the detector 26, and to telemeter data and control signals to and from the surface instrumentation 32 (FIG. 1). A sonde telemetry system 38 provides two way communication via cable 14 to the surface telemetry unit 30. The combined surface-sonde telemetry system is preferably a duplex digital system capable of transmitting data to the surface from the sonde 10 simultaneously with the transmission of control commands downhole to the sonde 10 from a surface control system (not shown) included in the surface instrumentation 32. A suitable telemetry system is described in the commonly-owned U.S. Pat. No. 4,355,310 to A. Belaigues, et al., hereby incorporated by reference.

In the sonde, a digital tool bus 40 carries control and data signals, while a power bus 42 carries electrical power to an acquisition power supply 44 and an accelerator power supply 46. Busses 50 and 52 provide power to the acquisition control electronics 54 and the detector 26. Busses 56 and 58 provide power to the neutron accelerator 24 and to the accelerator control 60. Timing signals for controlling the operation of the accelerator control 60 are transmitted via line 62 from the acquisition control 54.

Gamma ray count pulses from the detector 26 are applied to the acquisition control electronics 54 via a data bus 64. An interface circuit 66 provides two way data and control signal transmission between the digital tool bus 40 and the acquisition control 54. An accelerator interface circuit 68 provides two way control signal transmission between the digital tool bus 40 and the accelerator control 60.

The preferred neutron accelerator 24 is of the pulsed D-T type adapted to generate discrete bursts of 14 MeV neutrons. Such accelerators are described in more complete detail in U.S. Pat. No. 2,991,364 to Goodman and U.S. Pat. No. 3,508,058 and U.S. Pat. No. 3,775,216, both to Frentrop. These three patents are hereby incorporated by reference.

The detector 26 preferably comprises an assembly of a scintillation crystal optically coupled to a photomultiplier tube. The preferred crystal for purposes of the present invention is made of gadolinium orthosilicate doped with cerium (GSO). The GSO crystal provides advantageous operating characteristics, including relatively high detection efficiency and energy resolution and the ability to operate in a borehole environment without special protection against contamination or temperature effects. A GSO detector is described in detail in the commonly-owned U.S. Pat. No. 4,883,956 to Schweitzer et al., which is hereby incorporated by reference. Other types of energy-responsive gamma ray detectors may of course be used, such as, for example, sodium or cerium iodide, BGO, germanium, etc. The phototube to be used with the detector assembly may be commercially available tubes sold by such companies as EMR, Inc. and RCA.

Figure 4A:
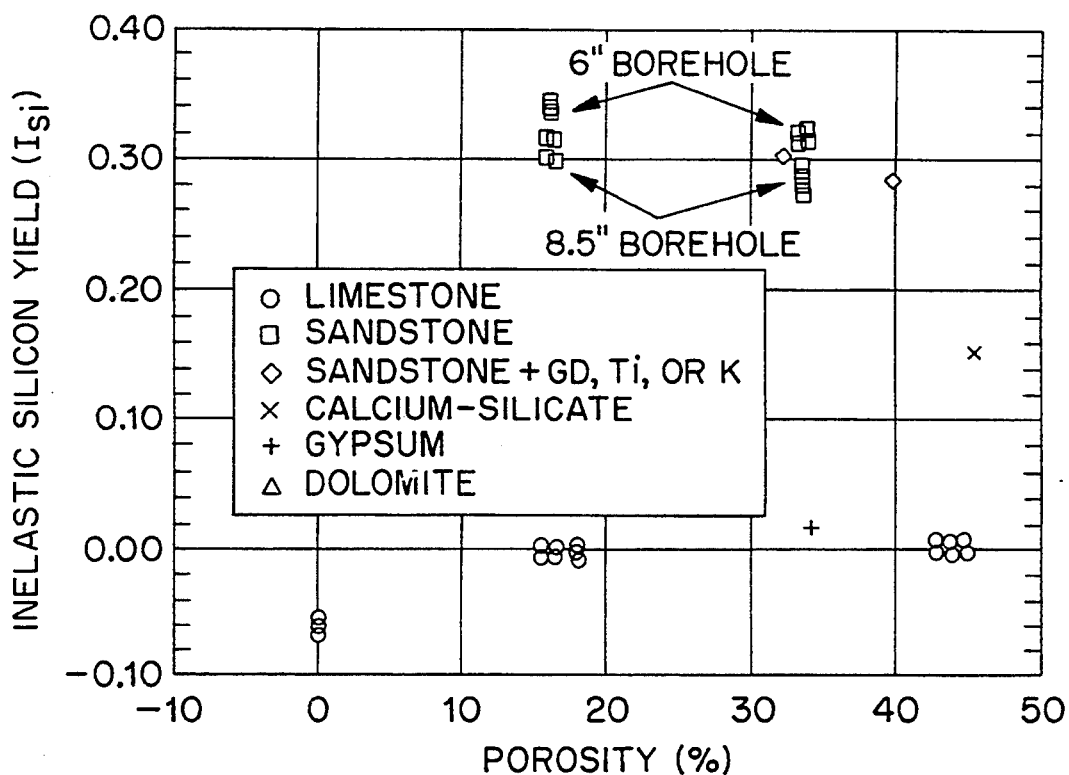
FIGS. 4a and 4b are plots of the relative inelastic gamma ray yield for silicon ($I_{si}$) versus porosity and weight percent of silicon, respectively, for formation materials of known sandstone, limestone and other composition in open hole.

FIG. 4a is a plot of the relative inelastic gamma ray yields for silicon $I_{si}$ obtained by spectral fitting inelastic gamma ray spectra taken in various open-hole test formations of 100% sandstone and 100% limestone composition, respectively, boreholes of 6 and 8.5 inches diameter and porosities of 0, 17 and 42 percent. Several data points for sandstone formations containing gadolinium, titanium or potassium are also shown, as are two data points for gypsum and calcium-silicate formations. As can be observed, the inelastic silicon yields are close to zero for the limestone formations. Although the yield is offset below zero for the 0% limestone formation, this is believed to be an aberration due to tool background contribution or possibly to different levels of magnesium contamination in the high porosity and the 0% formations.

The $I_{si}$ yields for the sandstone formations are tightly clustered around 0.3 and exhibit only a slight porosity sensitivity and a slight borehole size sensitivity. If desired, the sensitivity of $I_{si}$ to borehole size could be reduced somewhat by backshielding the detector against borehole gamma rays. In any event, the relative inelastic silicon yield $I_{si}$ does not vary significantly (less than 5%) among the different formations with porosity or borehole size.

The two data points for the 17% and 42% porosity calcium-silicate formations are also well separated from both the sandstone formations and the limestone formations. This indicates that the relative silicon yield $I_{si}$ is also useful in identifying mixtures of sandstone and limestone.

The data of FIG. 4a indicate that the logging tool can be calibrated by making $I_{si}$ measurements in calibration apparatus (test formations) having formation materials of known sandstone composition and relating the $I_{si}$ yields to the known sandstone content of the test formations. The predetermined calibration relationship thus derived can then be used to provide an estimate of the volumetric content or fraction of sandstone in an unknown formation based solely on the relative inelastic gamma ray yield. Although this is not too surprising given that the depth of investigation of the inelastic measurement does not change dramatically as the borehole or formation characteristics change, it is surprising in light of the normal statistical quality of inelastic spectroscopy measurements. Indeed, it has been found that approximately 10 seconds of detector count rate data allows the sandstone content to be determined from the relative inelastic silicon yield $I_{si}$ to about 10% accuracy using the calibration relationship illustrated in FIG. 4.

Figure 4B:
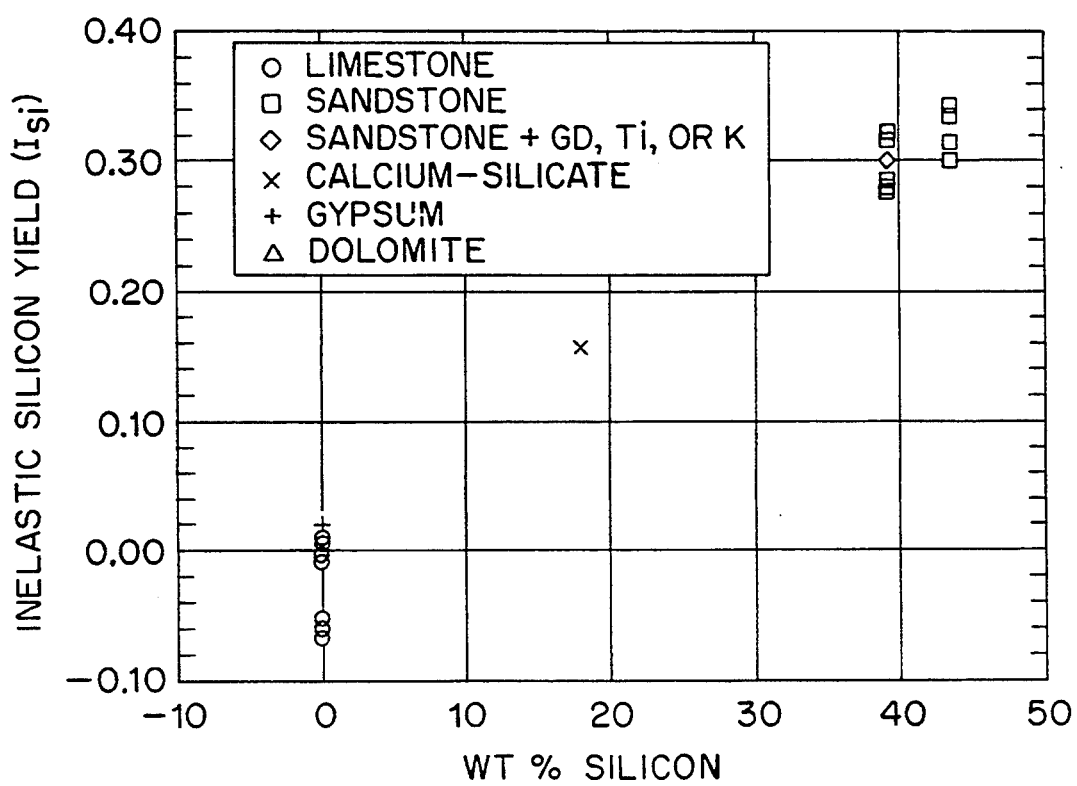

FIG. 4b shows the relative inelastic yields for silicon $I_{si}$ plotted against the weight percent of silicon in formations of known silicon content. Once again, it is apparent that the sandstone formations are clearly distinguishable from the limestone and other formations, including calcium-silicate formations. As will be appreciated, by calibrating the $I_{si}$ yields against weight percent of silicon in this manner, it is possible to derive an estimate of the elemental concentration of silicon in an unknown formation based solely on the relative $I_{Si}$.

Figure 5A:
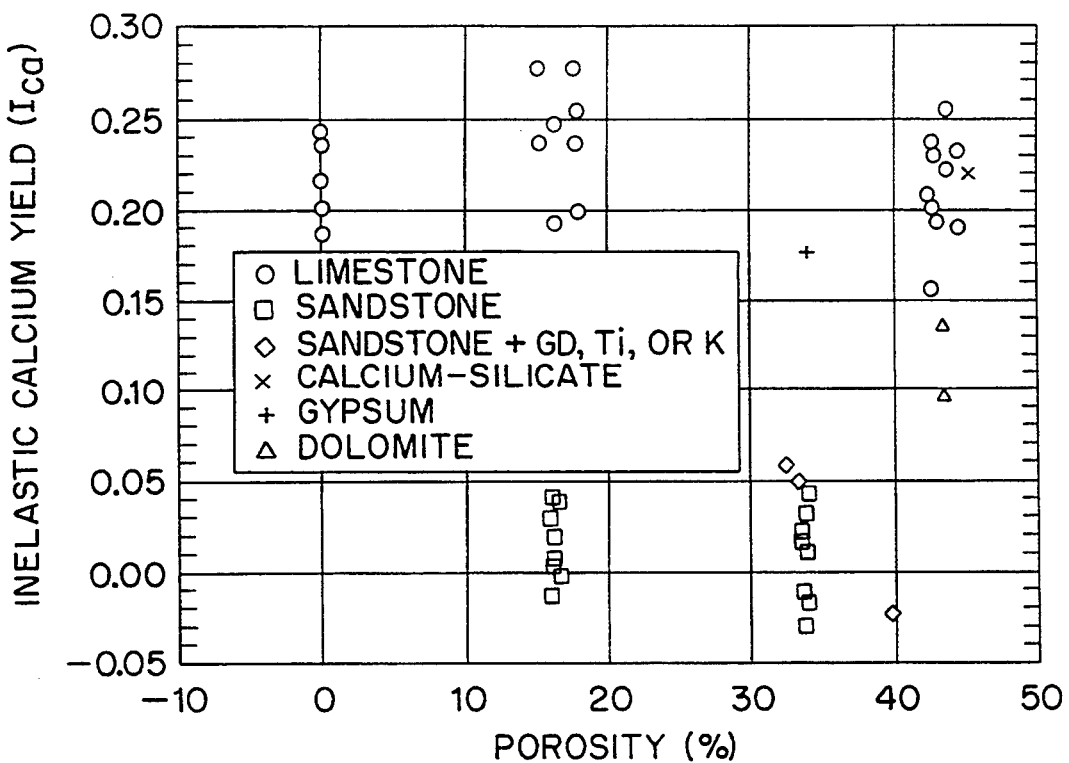
FIGS. 5a and 5b are plots of the relative inelastic gamma ray yield for calcium ($I_{ca}$) versus porosity and weight percent of calcium, respectively, for formation materials of known sandstone, limestone, dolomite and other composition in open hole.
Figure 5B:
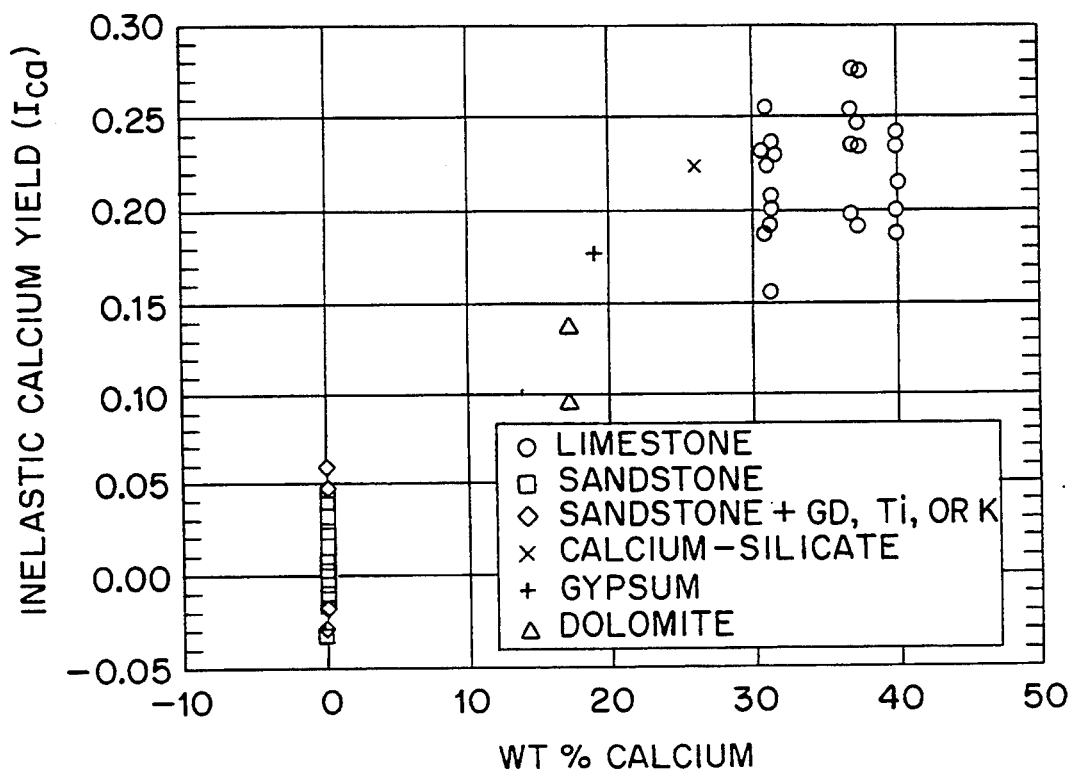

Similar trends can be seen from FIGS. 5a and 5b for the relative inelastic calcium yield $I_{ca}$, although the data have more scatter than with the $I_{si}$ yields. FIG. 5a shows $I_{ca}$ versus porosity for test formations of known sandstone, limestone and dolomite content and various borehole sizes and fluids. FIG. 5b shows similar data plotted as a function of the weight percent of calcium. The scatter in the data is believed to have resulted principally from the presence of unexpected amounts of magnesium in the limestone formations from which the inelastic calcium standard spectrum was derived. This introduced a bias in the inelastic calcium standard, which in turn perturbed the relative inelastic yield $I_{ca}$. Notwithstanding the scatter in the data and ignoring the systematic biases caused by the magnesium, it may be seen from FIGS. 5a and 5b that the $I_{ca}$ yields for the sandstone formations are close to zero and the $I_{ca}$ yields for the limestone formations are substantially in the 0.20 to 0.25 range. FIGS. 5a and 5b also show two $I_{ca}$ yields for dolomite formations, which are approximately half way between the sandstone formations and the limestone formations, i.e, in the 0.10 to 0.15 range.

The data of FIGS. 5a and 5b indicate the potential for calibrating the inelastic calcium yield $I_{ca}$ to provide an estimate of the limestone content and an estimate of the elemental concentration of calcium, respectively, of an unknown formation. Such calibration measurements would be made in test formations (calibration apparatus) of known limestone composition to determine calibration relationships between $I_{ca}$ and the known volume content of limestone and the known elemental concentration of calcium in the test formations. Once established, these predetermined calibration relationships, as well as those for the relative inelastic silicon yield and any other relative elemental yields of interest, e.g. Mg. Fe, etc., are stored in the tool computer memory for on-line conversion of the relative inelastic yields determined for the measured unknown spectra to volume estimates of the limestone (etc.) content of the formation and for converting the-relative elemental yields to elemental concentrations. The data of FIGS. 5a and 5b indicate that the volume content of limestone and the elemental concentration of calcium in an unknown formation can be estimated to approximately 10% accuracy from the relative inelastic calcium yield.

Figure 6A:
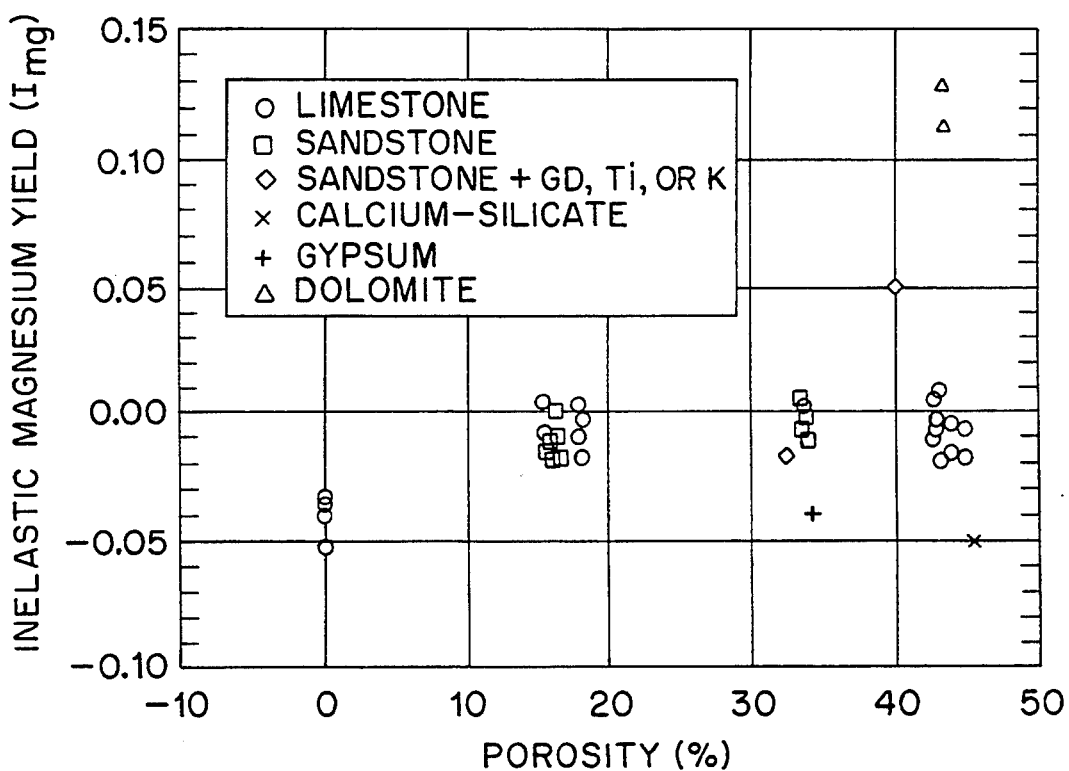
FIGS. 6a and 6b are plots of the relative inelastic gamma ray yield for magnesium ($I_{Mg}$) versus porosity and weight percent of magnesium, respectively, for formation materials of known sandstone, limestone, dolomite and other composition in open hole.
Figure 6B:
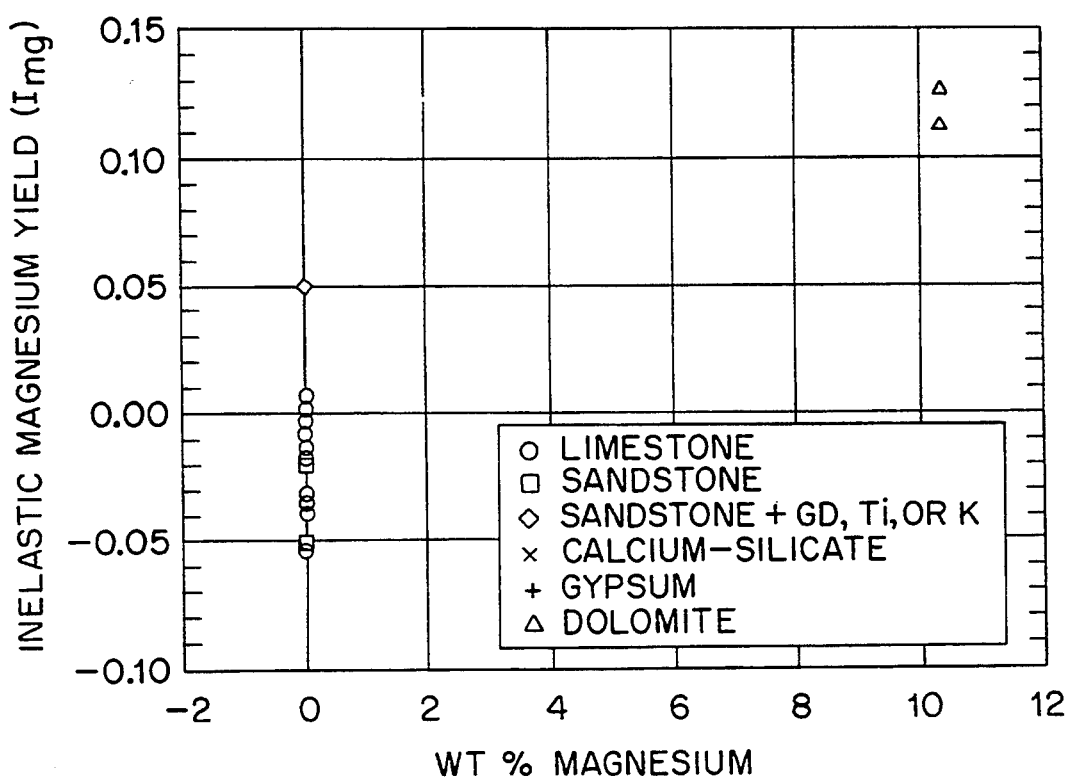

FIGS. 6a and 6b show similar data for magnesium, and indicate that the relative inelastic magnesium yields $I_{Mg}$ for fully dolomitized formations are well separated from either sandstone formations or limestone formations; i.e., by approximately 0.10-0.125. These data are consistent with those of FIGS. 5a and 5b, which show the relative inelastic calcium yield for dolomite formations to be in the 0.1 to 0.15 range. Hence calibration relationships can be established, in the manner already described, between the relative inelastic magnesium yield $I_{Mg}$ and either the volumetric content of dolomite in a formation or the elemental concentration of magnesium in the formation.

As an alternative indicator of the degree of dolomitization of a formation, the ratio of the relative inelastic yields for magnesium and calcium, $I_{Mg}/I_{ca}$, may be formed and recorded as a function of depth. The higher the ratio the greater the degree of dolomitization.

Figure 7:
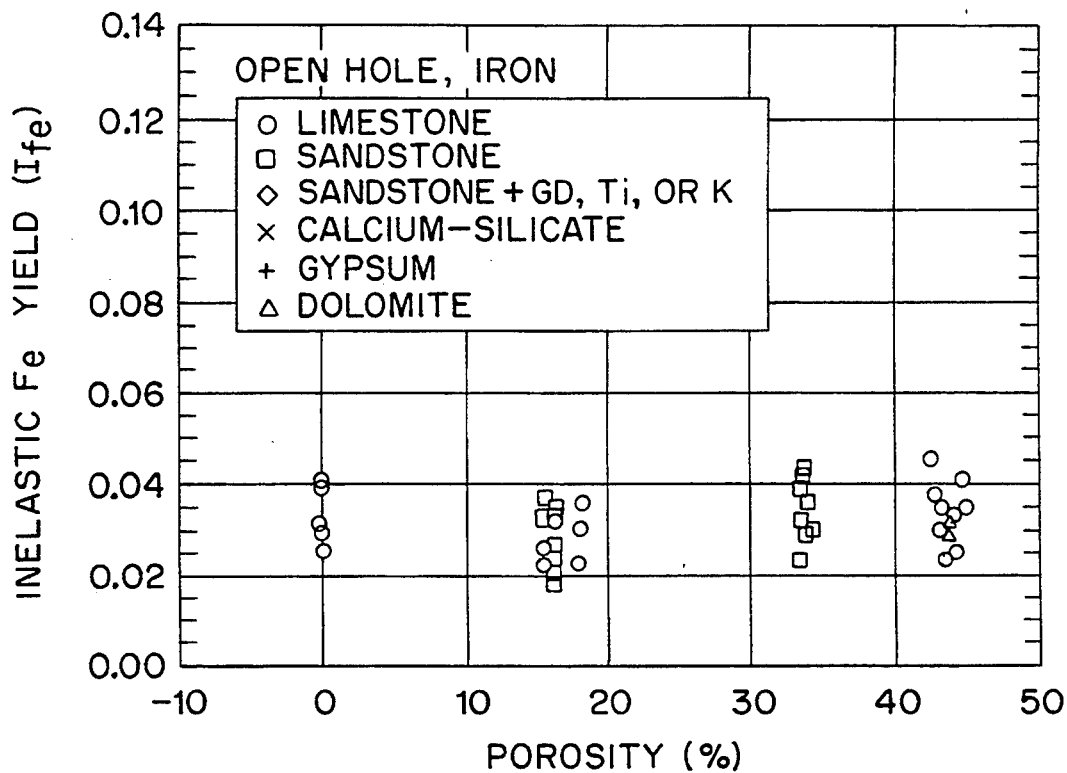
FIG. 7 is a plot of the relative inelastic gamma ray yield for iron ($I_{Fe}$) versus porosity for formation materials of known sandstone, limestone and dolomite composition in open hole.
Figure 8:
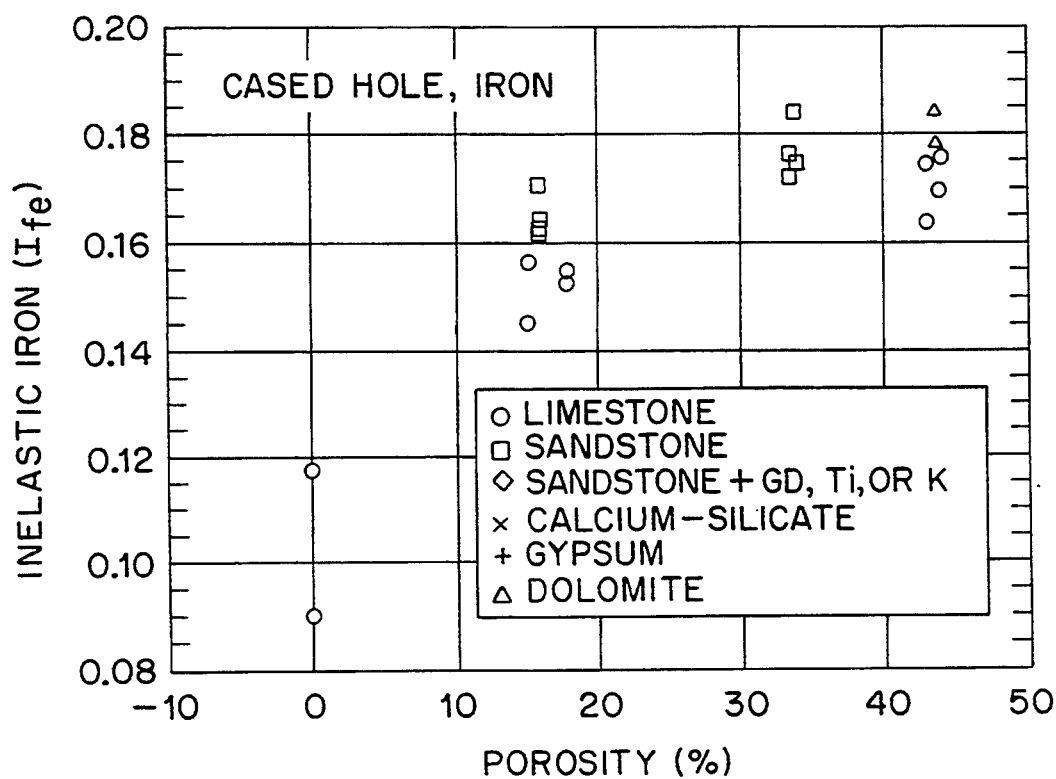
FIG. 8 is a plot of the relative inelastic gamma ray yield for iron ($I_{Fe}$) versus porosity for formation materials of known sandstone, limestone and dolomite composition in cased hole.

FIG. 7 depicts the relative inelastic yield $I_{Fe}$ for iron for sandstone, limestone and dolomite formations of various porosities in openhole, with no iron in the formations. FIG. 8 shows similar data for cased hole, but again with no iron in the formation.

In the openhole case of FIG. 7, the only background iron present is from the tool. The magnitude of $I_{Fe}$, responding to the iron in the tool pressure housing, is seen to be substantially constant across porosity and lithology. Because of the fixed depth of investigation of the inelastic scattering gamma ray measurement, the only iron in excess of background is from the formation and is attributable to shale or iron-bearing minerals. Thus by comparing the relative inelastic iron yield $I_{Fe}$ for an unknown uncased formation with the background relative inelastic iron yield, an estimate of the iron content of the formation can be determined. For example, a straightforward way of making such a comparison is to subtract the background $I_{Fe}$ (FIG. 7) from the measured $I_{Fe}$ to obtain a corrected $I_{Fe}$ for the formation. By derivation of a predetermined calibration relationship between the formation $I_{Fe}$ and the iron content of test formations of known composition, as aforementioned, the formation $I_{Fe}$ can be converted to an estimate of the iron volume of the unknown formation and of the elemental iron concentration of the formation.

The cased hole data of FIG. 8 (taken in a 6 inch borehole with a 5 inch-18 lb/ft steel casing) exhibit a substantial porosity sensitivity in the background value of $I_{Fe}$ Up to approximately 25-30%. $I_{Fe}$ is responding in this instance to the iron in the tool housing and the casing. There is also a sensitivity, although somewhat less, to matrix lithology. In order to determine the background inelastic iron signal in a cased hole, therefore, information as to the porosity of the surrounding formation is required, especially for low porosity formations. Once the background $I_{Fe}$ has been determined, the volume or concentration of iron in the unknown formation can be determined as described above in connection with FIG. 7.

In accordance with another feature of the invention, the aforementioned calibration of the relative inelastic yields $I_{si}$ and $I_{ca}$ can also be used to calibrate the relative capture gamma ray yields for silicon $C_{si}$ and calcium $C_{ca}$. Since the calibration factor will be the same for all capture elements present only in the formation, that calibration factor can then also be used to calibrate the relative capture yields for sulfur, titanium, gadolinium or any other elements included in the standard capture spectra. The availability of these additional calibrated capture yields is useful in making more thorough lithology interpretations.

The calibration of the capture yields is carried out by first forming an inelastic/capture sensitivity ratio for silicon and calcium:

$$R_{Si} = I_{Si} S_{iSi} / C_{Si} S_{cSi}$$

$$R_{Ca} = I_{Ca} S_{iCa} / C_{Ca} S_{cCa}$$

where $S_{iSi}$ and $S_{cSi}$ are the relative sensitivities for inelastic and capture silicon gamma rays and $S_{iCa}$ and $S_{cCa}$ are the relative sensitivities for inelastic and capture calcium gamma rays. Sensitivities may be in the form of oxide, mineral, or elemental weight or volume sensitivity as long as they are consistent.

Whichever ratio $R_{Si}$ or $R_{Ca}$ has the greater statistical precision is then selected for use as a calibration ratio with the other capture yields. This ratio is designated "R". Alternatively, the $R_{Si}$ and $R_{Ca}$ may be averaged to determine the calibration ratio R. Obviously $R_{Si}$ will be very bad if no silicon is present in the formation, and conversely for calcium. It is reasonable to assume, however, that most of the formations traversed by a well bore will contain a significant amount of one or the other silicon or calcium. Of course, where either $R_{Si}$ or $R_{Ca}$ is used by itself as the ratio R, there will not be a calibrated capture yield for that element.

The ratio R thus determined is then used to calibrate the other relative capture yields, i.e., to put them in the same parameter space as the inelastic yields, in accordance with the following relationship:

$$X = R C_X S_{CX}$$

where X is the calibrated capture yield for the element in question (in inelastic parameter space), $C_X$ is the relative capture yield for the element X, and $S_{CX}$ is the relative capture sensitivity for the element X. For example, the calibration capture yield for titanium would be $Ti = R C_{Ti} S_{CTi}$, and the calibrated capture yield for gadolinium would be $Gd = R C_{Gd} S_{CGd}$.

The calibrated capture yields X could then be interpreted or transformed into elemental volumetric components or elemental concentrations in the manner previously described for the inelastic yields.

As an alternative to the inelastic elemental volumetric computation described in connection with FIGS. 4–6, the volumetric contributions, or fractions, of the individual elemental oxides or minerals may be determined in the following manner: First, a normalized factor (NORM) is formed from (i) the sum of the products of the relative inelastic yields $I_X$ and their respective volume sensitivities $S_{iX}$ and (ii) the sum of the calibrated elemental capture yields X and their respective volume sensitivities $S_{cX}$. Thus:

$$NORM = \Sigma I_X S_{iX} + \Sigma X S_{cX}$$

In deriving NORM, the inelastic elemental yield or the calibrated capture elemental yield (but not both) for each element specifically attributable to the formation material is included in the summation. The elements specifically attributable to the formation material include elements that are present only in the formation or, if also present in the borehole, whose elemental yields have been corrected to eliminate the borehole contribution. As noted, for a given element only the yield from the inelastic measurement or the capture measurement is included, not both. Preferably, the yield having the greater statistical precision is selected for this purpose.

Second, the volumetric contribution (fraction) $V_X$ of the individual elemental constituents is then derived by dividing the product of the relative inelastic yield $I_X$ and the volume sensitivity $S_{iX}$ for that element by the normalization factor. The same computation can be made using the product of the calibrated capture yield X and its associated volume sensitivity $S_X$. Thus:

$$V_X = I_X S_{iX}/NORM \text{ and/or } V_X = X S_{cX}/NORM.$$

The elemental volumetric contributions $V_X$ may be utilized to derive information of lithology and other formation attributes. Preferred techniques for deriving such information are disclosed in the commonly-owned U.S. Pat. Nos. 4,712,424, 4,722,220, 4,773,264 and 4,903,527, the disclosures of which are hereby incorporated by reference.

As still a further aspect of the invention, the precision of the elemental concentration determination can be improved by combining the information from the capture and inelastic elemental yields. For example, the ratio $I_{si}$ to $I_{ca}$ determined from the inelastic spectrum for a given formation could be used (to the precision the ratio is known) as "prior information" in restraining the spectral-fitting process for the capture spectrum for that formation. Conversely, the ratio of the calibrated $C_{si}$ to $C_{ca}$ determined from an earlier fit of the capture spectrum from a formation could be used as a prior restraint (again to the precision known) in fitting an inelastic spectrum for the formation. The manner in which such "prior information" may be applied to the spectral-fitting process is disclosed in the commonly-owned U.S. Pat. No. 5,086,224 to Roscoe et al., which is hereby incorporated by reference.

Although the invention has been described and illustrated herein by reference to specific embodiments thereof, it will be understood that such embodiments are susceptible of variation and modification without departing from the inventive concepts disclosed. All such variations and modifications, therefore, are intended to be included within the spirit and scope of the appended claims.

I claim:

1. A method of investigating an earth formation traversed by a borehole, comprising the steps of:
    (a) repetitively irradiating an earth formation with bursts of high energy neutrons, which neutrons undergo inelastic scattering reactions and thermal neutron capture reactions with constituents in the borehole and the formation and produce gamma rays as a result thereof;
    (b) detecting gamma rays resulting from at least said inelastic scattering reactions;
    (c) generating an energy spectrum of the detected inelastic scattering gamma rays;
    (d) comparing said detected inelastic gamma ray energy spectrum with a composite spectrum, including a combination of standard inelastic gamma ray spectra for elements postulated to have contributed to said detected inelastic gamma ray spectrum and including at least one of silicon and calcium, to determine the relative inelastic elemental yield in said composite spectrum for each of said postulated elements contributing to the inelastic spectrum;
    (e) where silicon is included among the postulated elements in step (d), deriving from the relative inelastic yield for silicon, in accordance with a predetermined relationship relating the relative inelastic silicon yields determined in calibration apparatus having formation materials of known composition to the silicon content of the formation materials, an estimate of at least one of the volumetric content of sandstone and the concentration of silicon in the irradiated formation; and
    (f) where calcium is included among the postulated elements in step (d), deriving from the relative inelastic yield for calcium, in accordance with a predetermined relationship relating the relative inelastic calcium yields determined in calibration apparatus having formation materials of known composition to the calcium content of the formation materials, an estimate of at least one of the volumetric content of limestone and the concentration of calcium in the irradiated formation.

2. The method of claim 1, wherein step (d) includes determining the relative inelastic yield for magnesium.

3. The method of claim 2, further comprising the step of:
   (g) deriving from the relative inelastic magnesium yield, in accordance with a predetermined relationship relating the relative inelastic magnesium yields determined in calibration apparatus having formation materials of known composition to the magnesium content of the formation materials, an estimate of at least one of the volumetric content of dolomite and the concentration of magnesium in the irradiated formation.

4. The method of claim 2, further comprising the step of forming a ratio of the relative inelastic yields for magnesium and calcium as an indicator of the degree of dolomitization of the irradiated formation.

5. The method of claim 1, wherein step (d) includes determining the relative inelastic gamma ray yield for iron.

6. The method of claim 5, further comprising the step of:
   (h) deriving from the relative inelastic iron yield, in accordance with a predetermined relationship relating the relative inelastic iron yields determined in calibration apparatus having borehole regions of known iron content, an estimate of at least one of the volumetric content and the concentration of iron in the irradiated formation.

7. The method of claim 6, wherein the estimate of the iron content of or the iron concentration in the irradiated formation is derived by subtracting from the relative inelastic iron yield of step (d) the relative inelastic iron yield for a borehole region of substantially the same iron content as the irradiated borehole.

8. The method of claim 2 or 5, wherein the energy range of gamma rays detected in step (b) is from substantially 1.0 MeV to substantially 7.5 MeV.

9. The method of claim 1, further comprising the steps of:
   (g) detecting gamma rays resulting from said thermal neutron capture reactions;
   (h) generating an energy spectrum of said detected capture gamma rays;
   (i) comparing said detected capture gamma ray energy spectrum with a composite spectrum, including a combination of standard capture gamma ray spectra for elements postulated to have contributed to said detected capture gamma ray spectrum and including at least one of silicon and calcium, to determine the relative capture elemental yields in said composite spectrum for each of said postulated elements contributing to the capture spectrum;
   (j) where silicon is included among the postulated elements in steps (d) and (i), deriving from (1) the relative inelastic silicon yield and the inelastic gamma ray sensitivity for silicon and (2) the relative capture silicon yield and the capture gamma ray sensitivity for silicon an inelastic/capture sensitivity ratio $R_{Si}$ for silicon;
   (k) where calcium is included among the postulated elements in steps (d) and (i), deriving from (1) the relative inelastic calcium yield and the inelastic gamma ray sensitivity for calcium and (2) the relative capture calcium yield and the capture gamma ray sensitivity for calcium an inelastic/capture sensitivity ratio $R_{Ca}$ for calcium;
   (l) utilizing at least one of said ratios $R_{Si}$ and $R_{Ca}$ to provide a calibration ratio R; and
   (m) combining the calibration ratio R and the relative capture elemental yield and the capture gamma ray sensitivity for at least one other element to derive the calibrated capture elemental yield X of said at least one other element.

10. The method of claim 9, wherein step (l) comprises deriving the calibration ratio R by using the more statistically precise of $R_{Si}$ and $R_{Ca}$ or by averaging the values of $R_{Si}$ and $R_{Ca}$.

11. The method of claim 9, wherein step (m) comprises deriving the calibrated capture elemental yield X for said at least one other element by combining the calibration ratio R and the relative capture elemental yield $C_X$ and the elemental capture gamma ray sensitivity $S_{CX}$ in accordance with the relationship $X = RC_X S_{CX}$.

12. A method of investigating an earth formation traversed by a borehole, comprising the steps of:
   (a) repetitively irradiating an earth formation with bursts of high energy neutrons, which neutrons undergo inelastic scattering reactions and thermal neutron capture reactions with constituents in the borehole and the formation and produce gamma rays as a result thereof;
   (b) separately detecting gamma rays resulting from said inelastic scattering reactions and said thermal neutron capture reactions;
   (c) generating an energy spectrum of the detected inelastic scattering gamma rays and an energy spectrum of the detected thermal neutron capture gamma rays;
   (d) comparing said detected inelastic gamma ray energy spectrum with a composite spectrum, including a combination of standard inelastic gamma ray spectra for elements postulated to have contributed to said detected inelastic gamma ray spectrum and including at least one of silicon and calcium, to determine the relative inelastic elemental yield in said composite spectrum for each of said postulated elements in the inelastic spectrum;
   (e) comparing said detected capture gamma ray energy spectrum with a composite spectrum, including a combination of standard capture gamma ray spectra for elements postulated to have contributed to said detected capture gamma ray spectrum and including at least one of silicon and calcium, to determine the relative capture elemental yield in said composite spectrum for each of said postulated elements in the capture spectrum;
   (f) deriving from at least one of (1) the relative inelastic silicon yield and the relative capture silicon yield and their respective gamma ray sensitivities and (2) the relative inelastic calcium yield and the relative capture calcium yield and their respective gamma ray sensitivities a calibration ratio R; and
   (g) combining the calibration ratio R and the relative capture yield and the capture gamma ray sensitivity for at least one element postulated to have contributed to the detected capture gamma ray spectrum to derive a calibrated capture elemental yield X for said at least one element.

13. The method of claim 12, wherein step (g) comprises deriving a calibrated capture elemental yield X for at least each of the elements specifically attributable to the irradiated formation and not used in determining the ratio R.

14. The method of claim 13, further comprising the steps of:
   (h) deriving a normalization factor from the sums of (1) the products of the relative inelastic elemental yields for elements specifically attributable to the irradiated formation and their respective inelastic gamma ray sensitivities and (2) the products of the calibrated capture elemental yields for elements specifically attributable to the irradiated formation and their respective capture gamma ray sensitivities; and
   (i) deriving the volumetric fraction of at least one element in the irradiated formation by dividing the product of (1) the relative inelastic yield and the inelastic gamma ray sensitivity for said at least one element or (2) the calibrated capture yield and the capture gamma ray sensitivity for said at least one element by the normalization factor.

15. Apparatus for investigating an earth formation traversed by a borehole, comprising:
   (a) means for repetitively irradiating an earth formation with bursts of high energy neutrons, which neutrons undergo inelastic scattering reactions and thermal neutron capture reactions with constituents in the borehole and the formation and produce gamma rays as a result thereof;
   (b) means for detecting gamma rays resulting from said inelastic scattering reactions and said thermal neutron capture reactions;
   (c) means for generating an energy spectrum of the detected inelastic scattering gamma rays;
   (d) means for comparing said detected inelastic gamma ray energy spectrum with a composite spectrum, including a combination of standard inelastic gamma ray spectra for elements postulated to have contributed to said detected inelastic gamma ray spectrum and including at least one of silicon and calcium, to determine the relative inelastic elemental yield in said composite spectrum for each of said postulated elements contributing to the inelastic spectrum;
   (e) where silicon is included among the postulated elements in step (d), means for deriving from the relative inelastic yield for silicon, in accordance with a predetermined relationship relating the relative inelastic silicon yields determined in calibration apparatus having formation materials of known composition to the silicon content of the formation materials, an estimate of at least one of the volumetric content of sandstone and the concentration of silicon in the irradiated formation; and
   (f) where calcium is included among the postulated elements in step (d), means for deriving from the relative inelastic yield for calcium, in accordance with a predetermined relationship relating the relative inelastic calcium yields determined in calibration apparatus having formation materials of known composition to the calcium content of the formation materials, an estimate of at least one of the volumetric content of limestone and the concentration of calcium in the irradiated formation.

16. The apparatus of claim 15, wherein the means for comparing includes determining the relative inelastic yield for magnesium.

17. The apparatus of claim 16, further comprising:
   (g) means for deriving from the relative inelastic magnesium yield, in accordance with a predetermined relationship relating the relative inelastic magnesium yields determined in calibration apparatus having formation materials of known composition to the magnesium content of the formation materials, an estimate of at least one of the volumetric content of dolomite and the concentration of magnesium in the irradiated formation.

18. The apparatus of claim 16, further comprising means for forming a ratio of the relative inelastic yields for magnesium and calcium as an indicator of the degree of dolomitization of the irradiated formation.

19. The apparatus of claim 15, wherein the comparing means includes means for determining the relative inelastic gamma ray yield for iron.

20. The apparatus of claim 19, further comprising:
   (g) means for deriving from the relative inelastic iron yield, in accordance with a predetermined relationship relating the relative inelastic iron yields determined in calibration apparatus having borehole regions of known iron content, an estimate of at least one of the volumetric content and the concentration of iron in the irradiated formation.

21. The apparatus of claim 20, wherein the means for deriving the estimate of the iron content of or the iron concentration in the irradiated formation comprises means for subtracting from said relative inelastic iron yield the relative inelastic iron yield for a borehole region of substantially the same iron content as the irradiated borehole.

22. The apparatus of claim 16 or 19, wherein the energy range of gamma rays detected by said detecting means is from substantially 1.0 MeV to substantially 7.5 MeV.

23. The apparatus of claim 15, further comprising:
   (g) means for generating an energy spectrum of said detected capture gamma rays;
   (h) means for comparing said detected capture gamma ray energy spectrum with a composite spectrum, including a combination of standard capture gamma ray spectra for elements postulated to have contributed to said detected capture gamma ray spectrum and including at least one of silicon and calcium, to determine the relative capture elemental yields in said composite spectrum for each of said postulated elements contributing to the capture spectrum;
   (i) where silicon is included among the postulated elements in steps (d) and (h), means for deriving from (1) the relative inelastic silicon yield and the inelastic gamma ray sensitivity for silicon and (2) the relative capture silicon yield and the capture gamma ray sensitivity for silicon an inelastic/capture sensitivity ratio $R_{Si}$ for silicon;
   (j) where calcium is included among the postulated elements in steps (d) and (h), means for deriving from (1) the relative inelastic calcium yield and the inelastic gamma ray sensitivity for calcium and (2) the relative capture calcium yield and the capture gamma ray sensitivity for calcium an inelastic/capture sensitivity ratio $R_{Ca}$ for calcium;
   (k) means for utilizing at least one of said ratios $R_{Si}$ and $R_{Ca}$ to provide a calibration ratio R; and
   (l) means for combining the calibration ratio R and the relative capture elemental yield and the capture gamma ray sensitivity for at least one other element to derive the calibrated capture elemental yield X of said at least one other element.

24. The apparatus of claim 23, wherein the calibration ratio R comprises the more statistically precise of $R_{Si}$ and $R_{Ca}$ or the average of the values of $R_{Si}$ and $R_{Ca}$.

25. The apparatus of claim 23, wherein the means for combining includes means for deriving the calibrated capture elemental yield X for said at least one other element by combining the calibration ratio R and the relative capture elemental yield $C_X$ and the elemental capture gamma ray sensitivity $S_{CX}$ in accordance with the relationship $X = RC_X S_{CX}$.

26. Apparatus for investigating an earth formation traversed by a borehole, comprising the steps of:
   (a) means for repetitively irradiating an earth formation with bursts of high energy neutrons, which neutrons undergo inelastic scattering reactions and thermal neutron capture reactions with constituents in the borehole and the formation and produce gamma rays as a result thereof;
   (b) means for detecting gamma rays resulting from said inelastic scattering reactions and from said thermal neutron capture reactions;
   (c) means for generating an energy spectrum of the detected inelastic scattering gamma rays and an energy spectrum of the detected thermal neutron capture gamma rays;
   (d) means for comparing said detected inelastic gamma ray energy spectrum with a composite spectrum, including a combination of standard inelastic gamma ray spectra for elements postulated to have contributed to said detected inelastic gamma ray spectrum and including at least one of silicon and calcium, to determine the relative inelastic elemental yield in said composite spectrum for each of said postulated elements in the inelastic spectrum;
   (e) means for comparing said detected capture gamma ray energy spectrum with a composite spectrum, including a combination of standard capture gamma ray spectra for elements postulated to have contributed to said detected capture gamma ray spectrum and including at least one of silicon and calcium, to determine the relative capture elemental yield in said composite spectrum for each of said postulated elements in the capture spectrum;
   (f) means for deriving from at least one of (1) the relative inelastic silicon yield and the relative capture silicon yield and their respective gamma ray sensitivities and (2) the relative inelastic calcium yield and the relative capture calcium yield and their respective gamma ray sensitivities a calibration ratio R; and
   (g) means for combining the calibration ratio R and the relative capture yield and the capture gamma ray sensitivity for at least one element postulated to have contributed to the detected capture gamma ray spectrum to derive a calibrated capture elemental yield X for said at least one element.

27. The apparatus of claim 26, wherein the means for combining derives a calibrated capture elemental yield X for at least each of the elements specifically attributable to the irradiated formation and not used in determining the ratio R.

28. The apparatus of claim 27, further comprising:
   (h) means for deriving a normalization factor from the sums of (1) the products of the relative inelastic elemental yields for elements specifically attributable to the irradiated formation and their respective inelastic gamma ray sensitivities and (2) the products of the calibrated capture elemental yields for elements specifically attributable to the irradiated formation and their respective capture gamma ray sensitivities; and
   (i) means for deriving the volumetric fraction of at least one element in the irradiated formation by dividing the product of (1) the relative inelastic yield and the inelastic gamma ray sensitivity for said at least one element or (2) the calibrated capture yield and the capture gamma ray sensitivity for said at least one element by the normalization factor.

29. A method of investigating an earth formation traversed by a borehole by analyzing gamma ray energy spectra recorded following irradiation of the formation with burst of high energy neutrons, comprising the steps of:
   (a) generating an energy spectrum of inelastic scattering gamma rays resulting from said neutron irradiation;
   (b) comparing said inelastic gamma ray energy spectrum with a composite spectrum, including a combination of standard inelastic gamma ray spectra for elements postulated to have contributed to said inelastic gamma ray spectrum and including at least one of silicon and calcium, to determine the relative inelastic elemental yield in said composite spectrum for each of said postulated elements contributing to the inelastic spectrum;
   (c) where silicon is included among the postulated elements in step (b), deriving from the relative inelastic yield for silicon, in accordance with a predetermined relationship relating the relative inelastic silicon yields determined in calibration apparatus having formation materials of known composition to the silicon content of the formation materials, an estimate of at least one of the volumetric content of sandstone and the concentration of silicon in the irradiated formation; and
   (d) where calcium is included among the postulated elements in step (b), deriving from the relative inelastic yield for calcium, in accordance with a predetermined relationship relating the relative inelastic calcium yields determined in calibration apparatus having formation materials of known composition to the calcium content of the formation materials, an estimate of at least one of the volumetric content of limestone and the concentration of calcium in the irradiated formation.

30. The method of claim 29, wherein step (b) includes determining the relative inelastic yield for magnesium.

31. The method of claim 30, further comprising the step of:
   (e) deriving from the relative inelastic magnesium yield, in accordance with a predetermined relationship relating the relative inelastic magnesium yields determined in calibration apparatus having formation materials of known composition to the magnesium content of the formation materials, an estimate of at least one of the volumetric content of dolomite and the concentration of magnesium in the irradiated formation.

32. The method of claim 30, further comprising the step of forming a ratio of the relative inelastic yields for magnesium and calcium as an indicator of the degree of dolomitization of the irradiated formation.

33. The method of claim 29, wherein step (b) includes determining the relative inelastic gamma ray yield for iron.

34. The method of claim 33, further comprising the step of:
   (e) deriving from the relative inelastic iron yield, in accordance with a predetermined relationship relating the relative inelastic iron yields determined in calibration apparatus having borehole regions of known iron content, an estimate of at least one of the volumetric content and the concentration of iron in the irradiated formation.

35. The method of claim 33, wherein the estimate of the iron content of or the iron concentration in the irradiated formation is derived by subtracting from the relative inelastic iron yield of step (c) the relative inelastic iron yield for a borehole region of substantially the same iron content as the irradiated borehole.

36. The method of claim 30 or 33, wherein the energy range of said gamma ray energy spectra is from substantially 1.0 MeV to substantially 7.5 MeV.

37. The method of claim 29, further comprising the steps of:
   (e) generating an energy spectrum of thermal neutron capture gamma rays resulting from said neutron irradiation;
   (f) comparing said capture gamma ray energy spectrum with a composite spectrum, including a combination of standard capture gamma ray spectra for elements postulated to have contributed to said capture gamma ray spectrum and including at least one of silicon and calcium, to determine the relative capture elemental yields in said composite spectrum for each of said postulated elements contributing to the capture spectrum;
   (g) where silicon is included among the postulated elements in steps (b) and (f), deriving from (1) the relative inelastic silicon yield and the inelastic gamma ray sensitivity for silicon and (2) the relative capture silicon yield and the capture gamma ray sensitivity for silicon an inelastic/capture sensitivity ratio $R_{Si}$ for silicon;
   (h) where calcium is included among the postulated elements in steps (b) and (f), deriving from (1) the relative inelastic calcium yield and the inelastic gamma ray sensitivity for calcium and (2) the relative capture calcium yield and the capture gamma ray sensitivity for calcium an inelastic/capture sensitivity ratio $R_{Ca}$ for calcium;
   (i) utilizing at least one of said ratios $R_{Si}$ and $R_{Ca}$ to provide a calibration ratio R; and
   (j) combining the calibration ratio R and the relative capture elemental yield and the capture gamma ray sensitivity for at least one other element to derive the calibrated capture elemental yield X of said at least one other element.

38. The method of claim 37, wherein step (i) comprises deriving the calibration ratio R by using the more statistically precise of $R_{Si}$ and $R_{Ca}$ or by averaging the values of $R_{Si}$ and $R_{Ca}$.

39. The method of claim 38 wherein step (j) comprises deriving the calibrated capture elemental yield X for said at least one other element by combining the calibration ratio R and the relative capture elemental yield $C_X$ and the elemental capture gamma ray sensitivity $S_{CX}$ in accordance with the relationship $X=RC_X S_{CX}$.

40. A method of investigating an earth formation traversed by a borehole by analyzing gamma ray energy spectra recorded following irradiation of the formation with bursts of high energy neutrons, comprising the steps of:
   (a) generating an energy spectrum of inelastic scattering gamma rays resulting from said neutron irradiation and an energy spectrum of thermal neutron capture gamma rays resulting from said neutron irradiation;
   (b) comparing said inelastic gamma ray energy spectrum with a composite spectrum, including a combination of standard inelastic gamma ray spectra for elements postulated to have contributed to said inelastic gamma ray spectrum and including at least one of silicon and calcium, to determine the relative inelastic elemental yield in said composite spectrum for each of said postulated elements in the inelastic spectrum;
   (c) comparing said capture gamma ray energy spectrum with a composite spectrum, including a combination of standard capture gamma ray spectra for elements postulated to have contributed to said capture gamma ray spectrum and including at least one of silicon and calcium, to determine the relative capture elemental yield in said composite spectrum for each of said postulated elements in the capture spectrum;
   (d) deriving from at least one of (1) the relative inelastic silicon yield and the relative capture silicon yield and their respective gamma ray sensitivities and (2) the relative inelastic calcium yield and the relative capture calcium yield and their respective gamma ray sensitivities a calibration ratio R; and
   (e) combining the calibration ratio R and the relative capture yield and the capture gamma ray sensitivity for at least one element postulated to have contributed to the detected capture gamma ray spectrum to derive a calibrated capture elemental yield X for said at least one element.

41. The method of claim 40, wherein step (e) comprises deriving a calibrated capture elemental yield X for at least each of the elements specifically attributable to the irradiated formation and not used in determining the ratio R.

42. The method of claim 41, further comprising the steps of:
   (f) deriving a normalization factor from the sums of (1) the products of the relative inelastic elemental yields for elements specifically attributable to the irradiated formation and their respective inelastic gamma ray sensitivities and (2) the products of the calibrated capture elemental yields for elements specifically attributable to the irradiated formation and their respective capture gamma ray sensitivities; and
   (g) deriving the volumetric fraction of at least one element in the irradiated formation by dividing the product of (1) the relative inelastic yield and the inelastic gamma ray sensitivity for said at least one element or (2) the calibrated capture yield and the capture gamma ray sensitivity for said at least one element by the normalization factor.

43. A method of investigating an earth formation traversed by a borehole, comprising the steps of:

(a) repetitively irradiating an earth formation with bursts of high energy neutrons, which neutrons undergo inelastic scattering reactions and thermal neutron capture reactions with constituents in the borehole and the formation and produce gamma rays as a result thereof;

(b) detecting gamma rays resulting from at least said inelastic scattering reactions;

(c) generating an energy spectrum of said detected inelastic scattering gamma rays;

(d) comparing said detected inelastic gamma ray energy spectrum with a composite spectrum, including a combination of standard inelastic gamma ray spectra for elements postulated to have contributed to said detected inelastic gamma ray spectrum, to determine the relative inelastic elemental yield in said composite spectrum for at least iron; and (e) deriving from the relative inelastic iron yield, in accordance with a predetermined relationship relating the relative inelastic iron yield determined in calibration apparatus having borehole regions of known iron content, an estimate of at least one of the volumetric content and the concentration of iron in the irradiated formation.

44. The method of claim 43, wherein the estimate of the iron content of or the iron concentration in the irradiated formation is derived by subtracting from the relative inelastic iron yield of step (d) the relative inelastic iron yield for a borehole region of substantially the same iron content as the irradiated borehole.

45. The method of claim 43, wherein the energy range of gamma rays detected in step (b) is from substantially 1.0 MeV to 7.5 MeV.

46. Apparatus for investigating an earth formation traversed by a borehole, comprising the steps of:

(a) means for repetitively irradiating an earth formation with bursts of high energy neutrons, which neutrons undergo inelastic scattering reactions and thermal neutron capture reactions with constituents in the borehole and the formation and produce gamma rays as a result thereof;

(b) means for detecting gamma rays resulting from at least said inelastic scattering reactions;

(c) means for generating an energy spectrum of the detected inelastic scattering gamma rays;

(d) means for comparing said detected inelastic gamma ray energy spectrum with a composite spectrum, including a combination of standard inelastic gamma ray spectra for elements postulated to have contributed to said detected inelastic gamma ray spectrum, to determine the relative inelastic elemental yield in said composite spectrum for at least iron; and (e) means for deriving from the relative inelastic iron yield, in accordance with a predetermined relationship relating the relative inelastic iron yield determined in calibration apparatus having borehole regions of known iron content, an estimate of at least one of the volumetric content and the concentration of iron in the irradiated formation.

47. The apparatus of claim 46, wherein the means for deriving the estimate of the iron content of or the iron concentration in the irradiated formation comprises means for subtracting from said relative inelastic iron yield the relative inelastic iron yield for a borehole region of substantially the same iron content as the irradiated borehole.

48. The apparatus of claim 46, wherein the energy range of gamma rays detected is from substantially 1.0 MeV to 7.5 MeV.

49. A method of investigating an earth formation traversed by a borehole by analyzing inelastic scattering gamma ray energy spectra recorded following irradiation of an earth formation with bursts of high energy neutrons, comprising the steps of:

(a) generating an energy spectrum of inelastic scattering gamma rays resulting from said neutron irradiation;

(b) comparing said inelastic gamma ray energy spectrum with a composite spectrum, including a combination of standard inelastic gamma ray spectra for elements postulated to have contributed to said inelastic gamma ray spectrum, to determine the relative inelastic elemental yield in said composite spectrum for at least iron; and (c) deriving from the relative inelastic iron yield, in accordance with a predetermined relationship relating the relative inelastic iron yield determined in calibration apparatus having borehole regions of known iron content, an estimate of at least one of the volumetric content and the concentration of iron in the irradiated formation.

50. The method of claim 49, wherein the estimate of the iron content of or the iron concentration in the irradiated formation is derived by subtracting from the relative inelastic iron yield of step (b) the relative inelastic iron yield for a borehole region of substantially the same iron content as the irradiated borehole.

51. The method of claim 49, wherein the energy range of said inelastic gamma ray energy spectrum of step (a) is from substantially 1.0 MeV to 7.5 MeV.

* * * * *